United States Patent [19]

Matje et al.

[11] Patent Number: 4,814,302

[45] Date of Patent: Mar. 21, 1989

[54] STABLE SLIP-CASTING COMPOSITIONS HAVING A BASE OF POWDERS CONTAINING FINELY DIVIDED ALUMINUM NITRIDE

[75] Inventors: Peter Matje; Stefanie Diesch-Müller, both of Wiggensbach, Fed. Rep. of Germany

[73] Assignee: Elektroschmelzwerk Kempten GmbH, Fed. Rep. of Germany

[21] Appl. No.: 921,003

[22] Filed: Oct. 17, 1986

[30] Foreign Application Priority Data

Jan. 28, 1986 [DE] Fed. Rep. of Germany ....... 3602420

[51] Int. Cl.$^4$ .............................................. C04B 35/58
[52] U.S. Cl. ........................................ 501/96; 501/98; 264/86
[58] Field of Search ....................... 501/96, 98, 89, 92, 501/105; 264/86

[56] References Cited

U.S. PATENT DOCUMENTS

| | | | |
|---|---|---|---|
| 3,376,247 | 4/1968 | Reddy et al. | 501/97 |
| 4,296,065 | 10/1981 | Ishii et al. | 264/328 |
| 4,540,677 | 9/1985 | Enomoto et al. | 501/151 |
| 4,578,365 | 3/1986 | Huseby et al. | 501/98 |
| 4,626,516 | 12/1986 | Morelock | 501/92 |

FOREIGN PATENT DOCUMENTS

| | | | |
|---|---|---|---|
| 55-136175 | 10/1980 | Japan | 501/97 |
| 60-180954 | 9/1985 | Japan | 501/98 |

OTHER PUBLICATIONS

Cother et al., "The Development of Syalon Ceramics and Their Engineering Applications", Journal of Br. Cer. Soc., vol. 81, pp. 141-144, 1982.

Primary Examiner—William R. Dixon, Jr.
Assistant Examiner—Ann M. Knab
Attorney, Agent, or Firm—Burgess, Ryan & Wayne

[57] ABSTRACT

Stable slip casting composition having a total solids content of from 50 to 80 percent by weight on a base of finely divided, AlN-containing powders. It contains as liquid dispersion medium, water mixed with a water-soluble, aliphatic, polyvalent alcohol and admixtures for adjusting the viscosity required for slip casting. The liquid dispersion medium can contain, for instance, from 1 to 20 percent by weight of an alcohol such as glycerin calculated on the total weight of water and alcohol.

7 Claims, No Drawings

STABLE SLIP-CASTING COMPOSITIONS HAVING A BASE OF POWDERS CONTAINING FINELY DIVIDED ALUMINUM NITRIDE

FIELD OF THE INVENTION

This invention relates, in general, to a slip casting composition. In one aspect, this invention is directed to stable slip casting compositions comprised of aluminum nitride containing powders in a liquid dispersion medium.

BACKGROUND OF THE INVENTION

Polycrystalline molded bodies on a base of aluminum nitride which can be produced from AlN-containing starting powders by sintering with or without applying pressure, have been known for a long time. Because of their properties such as good resistance to high temperatures and oxidation, high heat conductivity and low electric conductivity, they are acquiring increased importance, particularly as crucible material for drawing monocrystals or as substrate materials.

Due to the limited molding possibilities in conventional hot presses, sintering processes are preferred for the production of parts having complicated shapes. In such processes the starting powders must first be compacted forming green bodies of the desired final shape before they can be sintered by heating.

Among the known molding processes for producing green bodies in the form, for instance, of thin plates or thin-walled crucibles, slip casting is particularly adequate since it not only saves time and expenses but has also proved satisfactory for other special ceramic materials (advanced ceramics) like those having a base of $Si_3N_4$ and of SiC (see E.M. Rabinovich et al., J. Mater. Sci. 1982, 17 (2), pp. 323-328; ref. in C.A. Vol. 96, 1982, No. 204230s and M. Persson et al., Mater. Sci. Monogr. 1983, 16 (Ceram. Powders) pp. 735-742; ref. in C.A. vol. 99, 1983, No. 75586y).

There is reference to a test using slip casting also for ceramic materials in British Pat. No. A-1052590. Here, organic solvents were used as liquid dispersion media exclusively. Such organic solvents include aliphatic and aromatic hydrocarbons or alcohol in which the polymer cyclopentadiene used as deflocculant is sufficiently soluble. However, in the examples sintering densities were not given for the use of ceramic powders on an AlN base with xylene as dispersion medium and subsequent sintering. Moreover, it is expressly pointed out that when using water as the dispersion medium it was practically impossible to obtain molded bodies with satisfactory qualities due to the fact that most ceramic materials contain impurities that react with water forming byproducts which unfavorably affect the physical consistency of the resulting bodies.

Another reference to the possible slip casting of ceramic powders on an AlN base is U.S. Pat. No. 4,184,884, but the indications are confined to saying that a slip casting composition with a content of approximately 50 to 70% solids in water is advantageous.

In EP-A-133275 which corresponds to U.S. Pat. No. 4,478,785 and which is concerned with the pressureless sintering of pure AlN molded bodies, slip casting is also mentioned among other known molding processes but it is indicated that such method has found practically no application for molding AlN-containing bodies. Slip casting compositions of that kind with organic solvents as dispersion medium are hard to manipulate and require additional adjuvants that must each be precisely adapted to the solvent used in order to balance the tendency to sedimentation of the AlN powder. Slip casting compositions having water as dispersion medium are not stable due to the known tendency to hydrolyzation of the aluminum nitride.

The problem that presented itself was to provide a slip casting composition with a high solids content on a base of finely divided AlN-containing powders in a liquid dispersion medium and added substances for regulating the viscosity required for slip casting, which composition would be easy to manipulate, require no additional adjuvants and be sufficiently stable both chemically and physically.

SUMMARY OF THE INVENTION

According to the present invention this problem is solved by providing a slip casting composition having a solids content of 50 to 80 percent by weight and containing as the liquid dispersion medium, water mixed with a water-soluble, aliphatic, polyvalent alcohol and admixtures for adjusting the viscosity required for slip casting. The liquid dispersion medium can contain, for instance, from 1 to 20 percent by weight of the alcohol such as glycerin calculated on the total weight of water and alcohol.

DETAILED DESCRIPTION OF THE INVENTION

As indicated above, the slip casting composition of the present invention employs a mixture of water with a water-soluble aliphatic, polyvalent alcohol as the liquid dispersion medium. As polyvalent alcohols there were advantageously selected those having 3 to 5 carbon atoms and 2 to 4 hydroxyl groups, glycerin having proved to be particularly satisfactory. The weight ratio of polyvalent alcohol to water can vary within the broad range of from 1:99 to 50:50. The amount of alcohol preferably is about 1 to 20 percent by weight calculated on the total weight of alcohol and water. Good results have been obtained, for instance, with about 5 to 10 percent by weight glycerin calculated on the total weight of glycerin and water.

For producing the slip casting composition according to the invention, finely divided AlN powders having particles sizes of 2 μm and finer have been used to advantage. As criterion for the particle size, one can use the specific surface measured according to BET. Powders with a specific surface within the range of 4 to $10 m^2$ per gram have proved satisfactory. There can also be used sintering adjuvants that favor the densification of the AlN green bodies in the subsequent sintering such as $Y_2O_3$, $Cr_2O_3$, CaO and MgO in amounts of up to about 5 percent by weight calculated on the total weight of the solids. Also, other ceramic powders, such as $Al_2O_3$, $ZrO_2$, BN, $Si_3N_4$ and SiC can be used when it is intended to produce composite materials on an AlN base. The sintering adjuvants and the ceramic powders must have approximately the same particle sizes as the AlN powder.

For producing the slip casting composition according to the invention, the solids are suspended in the alcohol/water mixture by means of conventional known steps, for instance, by stirring in mixing agitators and by adding a commercially available deflocculant adjusted to the viscosity needed for slip casting. As deflocculant there are advantageously selected substances that do not affect the pH value such as those having a base of carboxylic acid ester or of polyacrylate. The addition of adjuvants like binders, deflocculants or protective colloids is not generally necessary but can be employed if desired. When employed, one must select only those that can be carbonized without having a residue in order that the densification operation in the subsequent sintering of the green bodies is not adversely affected by residues of such adjuvants.

By observing the above mentioned conditions, it is possible to prepare, with a solids content of 50 to 80 percent by weight, a slip casting composition according to the invention that has sufficient chemical and physical stability in the time required for the slip casting. The time in the mold can be extended by carrying out the preparation of the slip casting composition at temperatures below 0° C. The possible lowering to the freezing point depends on the amount of alcohol in the aqueous dispersion medium. Thus, it is possible, for instance, to work at −5° C. with an addition of 5 percent by weight of glycerin in the aqueous dispersion medium.

The green bodies, which are produced in molding by slip casting in a manner known per se with the aid of the slip casting composition according to the invention, are those molded parts with open porosity, that is, with pores open toward the surface and which have a green density of at least 60% of the theoretically possible density. The green bodies are of good quality, that is, they are porous with uniform distribution of solids. No crack formation is to be observed when drying the slip solidified in the mold. By orienting sintering tests, it has been found that said green bodies can be sintered forming polycrystalline molded bodies on an AlN base with a theoretical density of at least 95%, especially at least 98%.

The dispersion medium on an aqueous base used in the slip casting composition according to the invention has a good compatibility with the molds used for slip casting that usually consist of gypsum, and therefore they can be repeatedly used, which is advantageous for economic reasons. Working with a dispersion medium on an aqueous base offer the additional advantage of simple and environmentally favorable manipulation.

The slip casting compositions according to the invention can also be processed in slip die casting machines in which porous, plastic-coated metal molds are used instead of the gypsum molds. This method is especially adequate for the economic production of hollow ceramic parts of complicated shape wherein it is a condition that the slip casting composition be kept homogeneous in reservoirs and storage circuits.

In the examples that follow there has been used for the production of the slip casting composition, a technical AlN powder having the following characteristics:

$O_2$: 2.9 % by weight
$N_2$: 32.1 % by weight
$C_{adherent}$: 0.3 % by weight
$Fe_{adherent}$: 0.30 % by weight
spec. surface according to BET: 5.5 m$^2$/g
average particle size: <2 μm

EXAMPLE 1

2000 g of the AlN powder together with one percent by weight yttrium oxide (average particle size 2 μm) in 1000 g of a prepared mixture of water with 10 percent by weight of glycerin added were introduced while stirring in a mixing agitator. During the introduction a commercially available deflocculant on a carboxylic acid ester base was slowly added, there having been required for obtaining a "cream-like" consistency of the slip casting composition a total of 0.11 percent by weight calculated on the total weight of the mixture. The slip casting composition thus obtained having a solids content of approximately 67 percent by weight was degasified in vacuum to remove entrapped air and then poured in gypsum molds for crucibles of 1000 ml capacity each. After obtaining the desired wall thickness of about 2.5 mm, the excessive slip casting composition was removed by pouring off. After shrinking off the bodies, they were removed from the mold and dried under vacuum. The green bodies thus produced in crucible form had a green density of 65% of the theoretically possible density. They were of uniform nature and had no cracks. After sintering at temperatures of >1700° C., the crucibles of polycrystalline AlN had a density of 98.1% of the theoretically possible density.

Comparison example:

For reasons of safety this example was carried out with a smaller amount:

50 g of the AlN powder together with 1 percent by weight $Y_2O_3$ were suspended in 25 ml water without admixture. Already while stirring up, the pungent smell of $NH_3$ was clearly perceptible. After about 15 minutes, the hydrolysis of the AlN led to boiling of the suspension under increased development of $NH_3$. After another 15 minutes the AlN had been practically completely hydrolyzed. It was not possible to produce a slip casting composition of AlN.

EXAMPLE 2

2000 g of a mixture of 80 percent by weight of the AlN powder and 20 percent by weight SiC of submicrofiness, together with one percent by weight of the $Y_2O_3$, were introduced, under the same conditions described in example 1, in 1000 g water with an added 10 percent by weight glycerin and a slip casting composition was prepared. After sintering, the crucibles of polycrystalline AlN and SiC had a density of 98% of the theoretically possible density.

EXAMPLE 3

2000 of the AlN powder, together with 1 percent by weight of the $Y_2O_3$, were introduced in water having an added 5 percent by weight glycerin, all the components having been cooled to −5° C. The slip casting composition thus prepared could be further processed with equally good results under the same conditions described in Example 1.

What is claimed is:

1. A stable slip casting composition having a total solids content of from about 50 to about 80% by weight on a base of finely divided, AlN-containing powders in a liquid dispersion medium, said liquid dispersion medium comprised of water mixed with a water-soluble, aliphatic, polyvalent alcohol in a respective weight ratio of from about 99:1 to about 50:50 and wherein said alcohol contains from 3 to 5 carbon atoms and from 2 to 4 hydroxyl groups.

2. The slip casting composition according to claim 1, wherein said liquid dispersion medium contains from about 1 to about 20% by weight of said alcohol calculated on the total weight of water and alcohol.

3. The slip casting composition according to claim 1, wherein said alcohol is glycerin.

4. The slip casting composition according to claim 1, which contains as solids AlN powder of particle sizes no greater than 2 μm.

5. The slip casting composition of claim 1 which contains sintering adjuvants selected from the group consisting of $Y_2O_3$, $Cr_2O_3$, CaO and MgO.

6. The slip casting composition of claim 5 which contains ceramic powders selected from the group consisting of $Al_2O_3$, $ZrO_2$, BN, $Si_3N_4$ and SiC.

7. The slip casting composition according to claim 1, which contains, as admixtures for adjusting the viscosity required for slip casting, liquifiers on a base of polyacrylate or of carboxylic acid ester.

* * * * *